United States Patent [19]

Wettstein

[11] Patent Number: 4,602,798
[45] Date of Patent: Jul. 29, 1986

[54] COLLET ARBOR FOR APPLICATION TO TURNING AND MILLING PROCEDURES

[76] Inventor: James Wettstein, 70 Lincoln St., East Hanover, N.J. 07936

[21] Appl. No.: 602,955

[22] Filed: Apr. 23, 1984

[51] Int. Cl.$^4$ ............................................. B23B 31/20
[52] U.S. Cl. ..................................... 279/48; 279/1 A; 279/42
[58] Field of Search ................ 279/1 A, 46 R, 51, 52, 279/53, 47, 48, 1 F, 43, 42; 408/238, 239 R, 239 A

[56] References Cited

U.S. PATENT DOCUMENTS

| 2,668,719 | 2/1954 | Harmon | 279/51 |
| 2,670,963 | 3/1954 | Osborn | 279/53 |
| 2,689,739 | 9/1954 | May | 279/52 |
| 2,833,546 | 5/1958 | Johnson | 279/51 |
| 3,115,800 | 12/1963 | Megel et al. | 279/48 |
| 3,547,454 | 12/1970 | Benjamin | 279/47 |
| 3,652,100 | 3/1972 | Baturka | 279/47 |
| 3,909,062 | 9/1975 | Benatti | 279/47 |

FOREIGN PATENT DOCUMENTS

| 138187 | 8/1950 | Australia | 279/47 |
| 231299 | 3/1944 | Switzerland | 279/47 |
| 374122 | 6/1973 | U.S.S.R. | 279/52 |

OTHER PUBLICATIONS

The 1984 Reynolds rmt Redbook, Erickson TG Collets, p. 85, TG Collets.
The 1984 Reynolds rmt Redbook, Erickson Collet Chucks, p. 86, Collet Chucks.
The 1984 Reynolds rmt Redbook, Universal Houdaille, pp. 132–135, Acura-Flex Collets.
The 1984 Reynolds rmt Redbook, Universal, pp. 136 and 137, V-Flange Tooling.
The 1984 Reynolds rmt Redbook, Universal Houdaille, p. 129, "Kwik-Switch Acura Flex Collet Chucks".
Parlec N/C Tolling Systems, Single Angle Collet Chucks, p. 24, #N50–10SC3, N50–15SC3 (Catalog Nos.)

Primary Examiner—Gil Weidenfeld
Assistant Examiner—Daniel W. Howell
Attorney, Agent, or Firm—Martha G. Pugh

[57] ABSTRACT

Collet arbor especially adapted for use in computerized numerical controlled turning and milling procedures.

The latter comprises four coaxially assembled elements:
  a clamping holder sleeve having a screw-threaded socket at the inner end, and a smooth, cylindrical interior except for an internal screw-threaded step, near the outer end;
  an externally-flanged hollow cylindrical adapter comprising an annular recess at its outer end and a stepped shank which screws into the screw-threaded step of the holder;
  a bushing with a flanged end which fits into the recessed adapter providing an inwardly-tapered mouth and a cylindrical barrel interposed into the adapter and holder for accommodating a collet; and
  a draw-screw having a hollow, internally-threaded head, externally smooth, which has its schank screwed into the holder socket so that the screw moves slidably in an axial direction in the cylindrical interior of the holder, the draw-screw head disposed to bear against the inner edge of the bushing barrel.

When the screw-threaded end of a collet enclosing a work tool in its jaws is screwed into the hollow-headed draw-screw, collet and bushing may be moved forward in axially controlled relation in the holder sleeve, bearing against the tapered mouth of the bushing which serves to tighten the collet jaws about the tool, and control the position of the tool in relation to the work.

3 Claims, 3 Drawing Figures

COLLET ARBOR FOR APPLICATION TO TURNING AND MILLING PROCEDURES

BACKGROUND OF THE INVENTION

This invention relates in general to bushings and collet arbors, more particularly of a type adapted for use in computerized numerical controlled (CNC) turning and milling.

In order to update their operations, many machine shops and factory machining operations are converting from prior art types of manually controlled milling machines to what is known in the trade as computerized numerical controlled (CNC) milling machines, in which the relationship between a spindle-rotated tool and a work piece mounted on an adjacent supporting table are completely controlled in accordance with a pre-set computer progam. This may require computerized control of both the speed of rotation and positioning of the tool, and the traverse of the work supporting table in X, Y and Z directions. Furthermore, it requires means for precisely and securely mounting and centering a selected tool in the spindle of the milling machine using a coupling which may be quickly fastened and unfastened to change tools. This function may be performed by collets of a unique shape such as Erickson TG type collets, which are specially designed for this purpose. However, this has the disadvantage of requiring the machine operator, at added expense, to acquire new sets of collets for the CNC milling operations, when he may have many sets of standarized collets in his inventory, such as the 3AT type, which are conventionally useful for many different types of manual drilling, boring and grinding operations, but do not fit onto the spindles of the new CNC type milling machines.

It is therefore the principal object of the present invention to provide an improved type of collet holder, more particularly a collet arbor, which is uniquely designed to adapt collets of a conventional type, such as the 3AT, to be secured to the spindles of CNC type milling machines. A further object of the invention is to provide, in the case of turning or lathe operations, a collet arbor of the type described in which tool changes can be readily effected without unclamping the collet arbor.

These and other objects are achieved in accordance with the present invention in a 4-part composite collet arbor comprising a lamping holder for connection to the milling machine spindle, which may be cylindrical, or alternatively, a tapered holder, which is constructed with an internally screw-threaded socket of restricted diameter along its central axis. The latter accommodates the stem of an outwardly-extended screw having a head of smooth cylindrical outer diameter, the outer end of which comprises a second socket which is internally screw-threaded. The clamping holder has a second internal screw-threaded portion near its outer end which terminates in an annular shoulder. The latter is constructed to accommodate an internal annular shoulder of the stepped, hollow, externally screw-threaded shank of a cylindrical adapter which has an annular external end-flange which has the same outer diameter as the holder, with which it fits flush when the external shoulder of the holder when the adapter is screwed in place in its innermost position. The fourth and outer element of the combination is a cylindrical bushing having an external end flange which is constructed to seat against an internal shoulder of the adapter. The mouth of the bushing is inwardly tapered at a small angle to form an inwardly-directed barrel of reduced diameter. All of the four elements fit together telescopically in coaxial relation, to accommodate a standard collet of the 3AT type, the jaws of which are secured against the tapered interior in the mouth of the last-named bushing. The barrel of the bushing is slotted; and the clamping holder accommodates a set-screw near its outer end which penetrates through its wall into the bushing slot to prevent the combination from rotating about an interposed collet. The screw-threaded inner end of the interposed collet seats in the internally screw-threaded socket in the head of the screw.

It will be apparent that a collet gripped in the combination described can be tightened to securely hold a tool in its jaws by slightly unscrewing the adapter so that if causes the bushing to move forward so that its inwardly tapered mouth compresses the jaws of the collet. The arbor combination is then screwed or otherwise fastened by means of the clamping holder into the spindle of a computerized numerical controlled machine for the milling operation.

If, in the case of lathe or turning operations, it is wished to quickly replace the tool, the adapter can be quickly unscrewed, and rescrewed without unclamping the clamping holder.

The invention, including its objects and advantages will be better understood from a study of the detailed specification hereinafter with reference to the attached drawings.

SHORT DESCRIPTION OF THE DRAWINGS

DETAILED DESCRIPTION OF THE INVENTION

Figure 1:
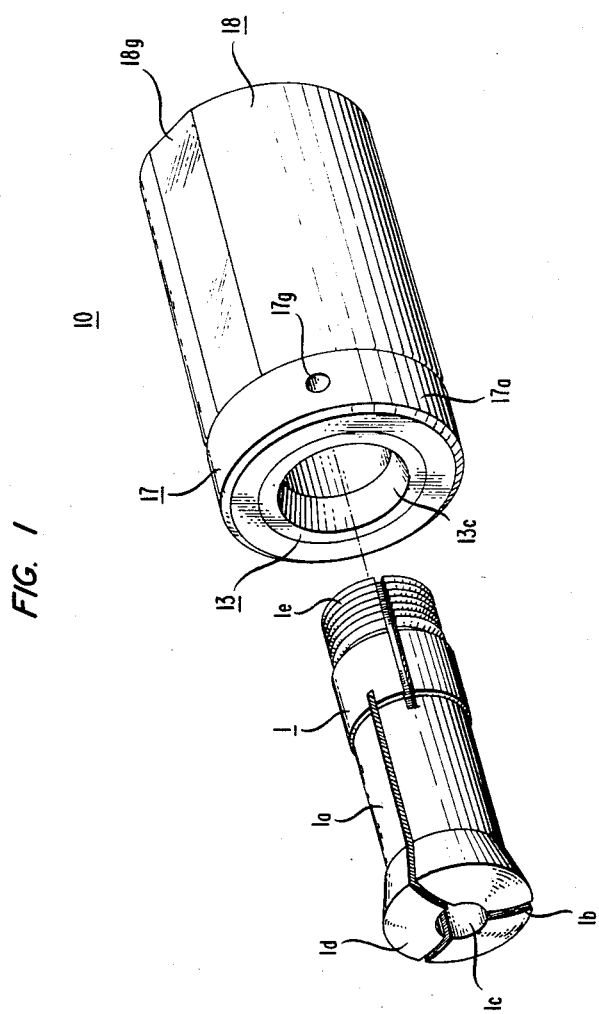
FIG. 1 is a perspective showing of the collet arbor of the present invention, assembled.
Figure 2:
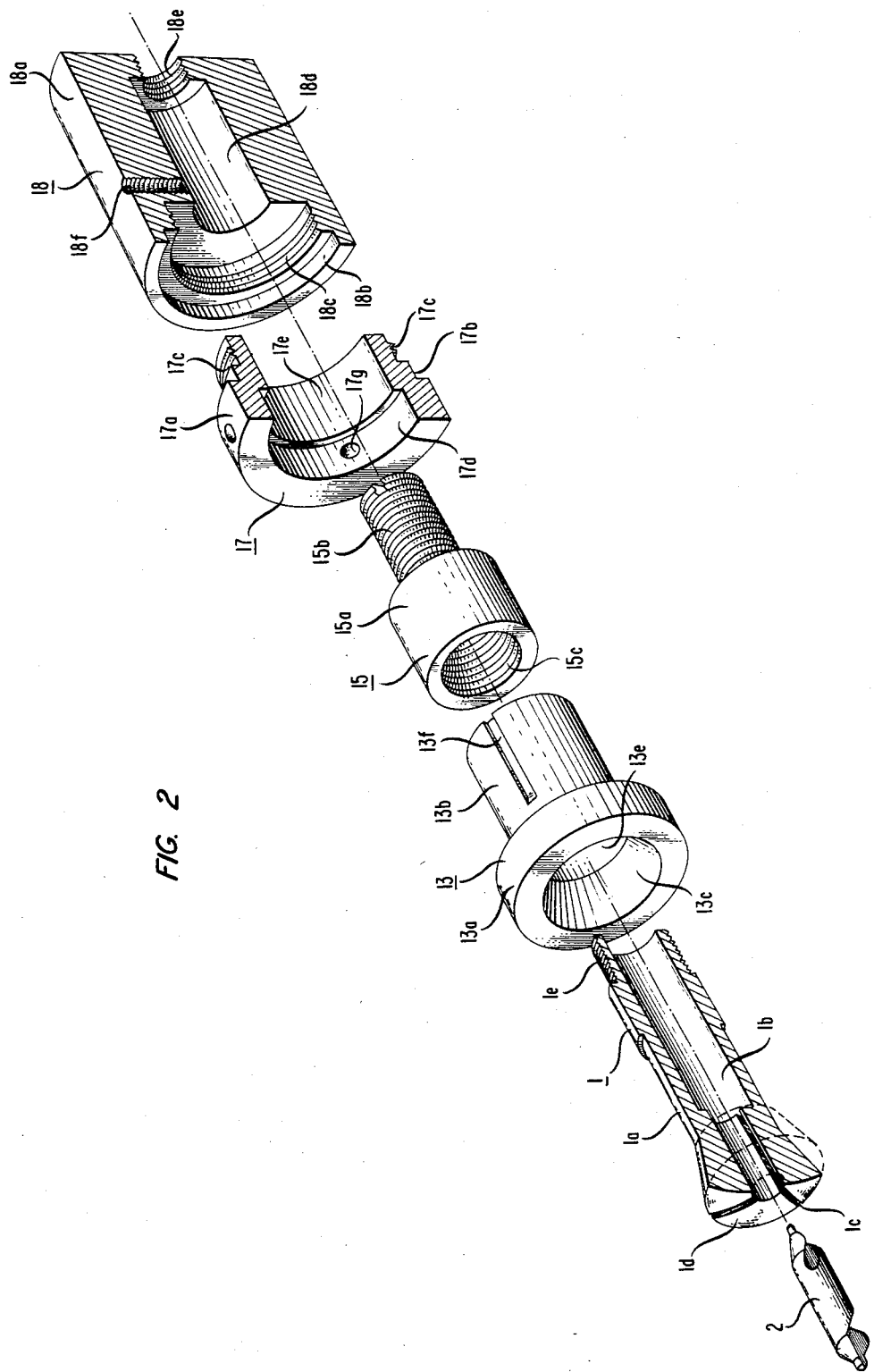
FIG. 2 is an exploded perspective, view partly sectioned, of the composite collet arbor of the present invention.
Figure 3:
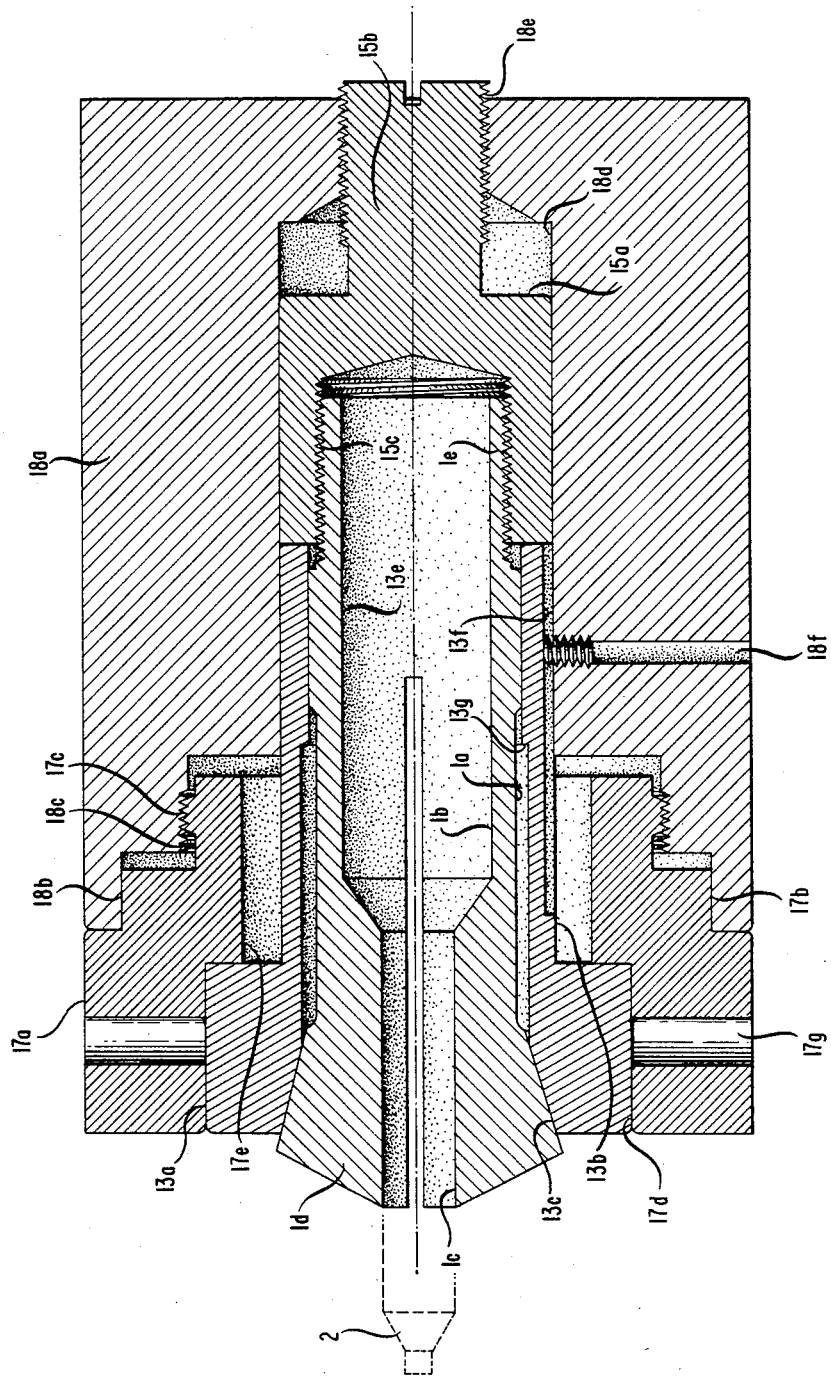
FIG. 3 is a sectional showing, taken along the plane indicated by the arrows 3—3 of FIG. 1 of the arbor in assembled relation with the collet enclosing a work tool.

FIG. 1 is an external perspective view of one form of the collet arbor 10 of the present invention, together with a collet 1 of the 3AT type, manufactured by Harding Brothers, Inc. of Elmira, N.Y., which is one of the standard types which the collet arbor of the preset invention is specifically adapted to accommodate. The collet arbor 10 is a composite comprising the clamping holder 18, the adapter 17, and the bushing 13, which are assembled in coaxial relation together with the internal screw 15 (as shown in FIGS. 2 and 3), to accommodate the collet 1.

In the present embodiment the collet arbor 10, when assembled, takes the form of an overall cylinder $3\frac{3}{8}$ inches in axial length and $2\frac{1}{2}$ inches in overall diameter, which has a longitudinal flat 18g which may be, for example $\frac{3}{8}$ inch wide, extending parallel to the axis, for clamping purposes.

Means comprising an axially projecting screw 15b is provided for securely coupling the collet arbor assemblage 10 in axial relation to the spindle of a lathe. This may alternatively take the form of a screw-threaded socket.

Preferably, the tool elements described herein would be of steel having a Rockwell hardness of 58-61. A suitable high quality steel for the purposes of the present invention is manufactured by LaSalle Steel Company, of Hammond, Ind., under the name STRESSPROOF Steel.

In the present illustration, collet 1, consists of a steel body 2⅜ inches in overall length, having a hollow cylindrical body portion 1a which is 1⅞ inches long, with a barrel 1a having an inner chamber 1b of inner diameter ½ inch, and outer diameter ⅝ inches. The inner end of chamber 1b, is screw-threaded to length of ½ inch externally. The outer end or jaw portion of collet 1, which extends beyond the uniform body portion 1a, is divided into three symmetrically-disposed outwardly-flared jaws 1d, which take the form of sectors assembled in an array of circular cross-section having a maximum outer diameter of 1 inch at the end face, which is slightly rounded. The jaws 1d flare outwardly forming cross-sectional angles of 15° with the outer side walls of chamber 1b. The size of the central axial bore 1c is decreased, when the grip of jaws 1d is tightened about a tool shaft or bit 2, depending on the extent to which jaws 1d are forced forward in contact with the beveled inner walls of the bushing 13, thereby constricting the slits 1h. A keying groove 1f, ⅛ inch wide and 1/16 inch deep is interposed parallel to the axis of collet body 1 for a distance of more than 1¼ inches from the jaws end.

Referring to FIGS. 2 and 3 which show the assemblage of FIG. 1 in exploded relation, and longitudinal section, respectively, collet 1, of the type described, is constructed to be interposed into the barrel 13b of the cylindrical steel bushing 13 of the present invention so that the flared jaws 1d of the collet 1 are in contact with the beveled internal walls 13c of the bushing 13.

In the embodiment under description, the bushing 13 comprises a cylindrical barrel 13b which is ⅞ inches in outer diameter, 11/16 inches in inner diameter, forming an internal chamber 13e extending 1½ inchs along the axis, which is of uniform diameter except for a slight shoulder 13g about ½ inch in from the inner end. The barrel 13b terminates in an external lateral flange 13a which is just under 1⅜ inches in outer diameter and 9/16 inch thick in an axial direction. The beveled inner wall 13c of the flange 13a decreases along an axial distance of ⅜ inch, from an internal diameter of 15/16 inch at the outer edge, to a diameter of ¾ inch at the junction with internal chamber 13e, so that the internal wall forms a cross-sectional angle of 15° with the axis of the barrel 13b. The latter has a longitudinal slot 13f which extends parallel to the axis, 1⅛ inches from the inner end.

The axial screw 15 has an inwardly-directed, externally screw-threaded stem 15b, which is just under ½ inch in outer diameter, and ¾ inch along the axis, which terminates in a hollow head 15a, with a smooth exterior ⅞ inch in outer diameter and 1 3/32 inches in axial length, and an internal screw-threaded socket 15c which is ⅝ inch in inner diameter and ¾ inch in axial length to accommodate the externally screw-threaded collar 1e on the inner end of the collet 1.

The cylindrical adapter 17 has an external flange 17a which is 2 1/14 inches in outer diameter and 1⅜ inches in inner diameter, forming an internal cylindrical collar 17d extending 9/16 inch along the axis to an internal shoulder forming a chamber 17e of reduced internal diameter 1 5/32 inches, extending ⅝ inch in an axial direction. The external surface of adapter 17, has a stepped back shoulder 17b which is 1 15/16 inches in outer diameter, which extends 3/16 inch in an axial direction from the inner face of the flange 17a, and which terminates at its inner end in an externally annular screw-threaded collar 17c which is about 1½ inches in outer diameter and 5/16 inch in axial extent.

In the present embodiment, the clamping holder 18 has a cylindrical outer surface 18a of uniform diameter of 2¼ inches. It will be understood, however, that clamping holder 18, in alternative form, may be tapered to assume well-known forms for coupling to the milling machine spindle. However, the internal configurations will be substantially the same as those described herein for the cylindrical clamping holder. The outer end has an internal flange or collar 18b having an internal diameter 1 61/64 inches, and extending ¼ inch in an axial direction, which is constructed to fit onto and mate in flush relationship with the annular shoulder 17b of adapter 17. The internal screw-threaded portion 18c of clamping holder 18 is 1 9/16 inches in inner diameter, and 5/18 inch in axial extent from the edge of annular shoulder 18b, and is constructed to receive and mate with the screw-threaded collar 17c of adapter 17. The internal cylindrical chamber 18d has a reduced uniform internal diameter of 29/32 inch, and extends 1¾ inches in an axial direction to the internal screw-threaded socket 18e which is ½ inch in diameter, extending ½ inch along the axis, and is constructed to receive and mate with the screw-threaded stem 15b of screw 15.

The screw hole 18f is interposed through the wall of clamping holder 18 in a direction normal to the axis, and accommodates a set-screw which keys into the groove 13f of the bushing 13, to keep the latter from rotating in the clamping holder 18.

The assemblage, including the collet 1, bushing 13, screw 15, adapter 17 and clamping holder 18, are fitted together in telescopic relation, forming a chuck or collet arbor for holding a tool, such as 2, in a fixed relation to a lathe, particularly of the computerized numerical controlled type during the turning operation. Four ¼ in holes 17g, which are interposed through the wall of flange 17a at symmetrically-spaced positions around its periphery, permit 17 to be rotated by means of a spanner wrench.

It is apparent that the lateral extent of the collet 1, mounted in the bushing 13, can readily be positioned in a lateral direction by screwing in or out the collet 1 from the external end of the assemblage. Further, in the case of lathing or turning operations. if it is desired to remove or change the collet 1 or the tool 2, the adapter 17 is quickly screwed inward, in flush relation with the external shoulder of holder 18, thereby causing bushing 13 to move inward, relaxing pressure against the jaws 1d of the collet 1, and freeing the collet to be removed by unscrewing it from the external end of the collet arbor and replaced with another collet without unclamping the holder 18. Once the collet 1 has been screwed into place in the assemblage its position is completely controlled, and centering of the tool 2 is assured.

It will be understood that the elements of the combination described, will have different dimensions and configurations depending on the type of collet they are manufactured for, typically the collets mentioned for a standard collet holder or bushing.

Although the various embodiments of the invention have been described in specific detail, as to form, dimensions and material, it will be understood that the invention is not be be construed as limited to the specific forms described by way of illustration, but only by the scope of the appended claims.

What is claimed is:

1. A collet arbor comprising an assemblage constructed to support a standard flared-head collet having a tool interposed into its jaws in working relation to a workpiece for end milling and turning, which comprises in combination four elements which fit together in telescoping coaxial relation, namely:

a clamping holder comprising a sleeve of smooth cylindrical interior having one end substantially closed except for an axially-disposed screw-threaded socket, and the other end open, having an annular internally screw-threaded collar of stepped, cross-section;

an externally flanged hollow cylindrical adapter comprising an annular recess at its outer end, and an externally screw-threaded annular shank at its inner end constructed to screw into the screw-threaded collar of the open end of said clamping holder in substantially coaxial mating relation with the annular surfaces coaxial with the axis of said holder, so that the position of said adapter along the axis of said arbor is controlled by the relation of said screw-threaded shank in said screw-threaded collar;

a bushing constructed to accommodate said collet in substantially coaxial relation, said bushing having a flanged end the external surface of which fits into the annular recess in the outer end of said adapter, said flanged end having an inwardly-tapered mouth which terminates in an inwardly-directed barrel which is constructed to be interposed into said adapter and said sleeve in coaxial relation thereto; and a draw-screw having a head with a hollow screw-threaded opening constructed to accommodate the end of said collet in screwed-in relation, said head having a substantially smooth external cylindrical surface constructed to move slidably in an axial direction along the internal surface of said sleeve, and said draw-screw having an axially centered inwardly-directed screw-threaded shank which is constructed to be screwed into the screw-threaded socket in said holder, the head of said screw being disposed to bear endwise against the inner edge of the barrel of said bushing, whereby when said collet enclosing a work tool in its jaws is screwed into the head of said draw-screw, the collet and bushing are constructed to be moved in controlled axial relation toward the external end of said clamping holder sleeve for tightening the jaws of said collet about said tool, thereby controlling the relation of said tool to the work by a three-way control mechanism which comprises the screwing and unscrewing of said draw-screw in said holder, the screwing and unscrewing of the inner end of said collet in the hollow screw-threaded opening in the head of said draw-screw, and the screwing and unscrewing of the externally screw-threaded annular shank of said cylindrical adapter in the annular internally screw-threaded collar of said clamping holder.

2. A collet arbor in accordance with claim 1 wherein the external shape of said clamping holder is substantially cylindrical and said external flange of said cylindrical adapter is substantially of the same diameter as said clamping holder.

3. A collet arbor in accordance with claim 1 wherein the external shape of said clamping holder is frustoconical, varying from a larger diameter adjacent its outer end to a small diameter adjacent its inner end.

* * * * *